US008650488B1

United States Patent
Wattenhofer et al.

(10) Patent No.: US 8,650,488 B1
(45) Date of Patent: Feb. 11, 2014

(54) IDENTIFYING CLASSIC VIDEOS

(75) Inventors: Mirjam Wattenhofer, Gockhausen (CH); Tom Broxton, Zurich (CH); Anders Brodersen, Wädenswil (CH); Jonas Yngvesson, Binz (CH); Jakub Petrykowski, Zurich (CH)

(73) Assignee: Google Inc., Mountain View, CA (US)

( * ) Notice: Subject to any disclaimer, the term of this patent is extended or adjusted under 35 U.S.C. 154(b) by 178 days.

(21) Appl. No.: 12/963,542

(22) Filed: Dec. 8, 2010

(51) Int. Cl.
G06F 3/00 (2006.01)
G06F 3/048 (2013.01)

(52) U.S. Cl.
USPC ............ 715/719; 715/716; 715/720; 715/721

(58) Field of Classification Search
USPC ................................. 715/716, 719, 720, 721
See application file for complete search history.

(56) References Cited

U.S. PATENT DOCUMENTS

| | | | |
|---|---|---|---|
| 6,421,067 B1 * | 7/2002 | Kamen et al. ................. | 715/719 |
| 6,466,918 B1 * | 10/2002 | Spiegel et al. ............... | 705/7.29 |
| 2003/0115589 A1 * | 6/2003 | D'Souza et al. ............... | 725/10 |
| 2003/0221198 A1 * | 11/2003 | Sloo .............................. | 725/136 |
| 2007/0136115 A1 * | 6/2007 | Senturk Doganaksoy et al. ................................. | 705/7 |
| 2008/0154889 A1 * | 6/2008 | Pfeiffer ........................... | 707/5 |
| 2009/0100456 A1 * | 4/2009 | Hughes .......................... | 725/14 |
| 2009/0199251 A1 * | 8/2009 | Badoiu et al. ................. | 725/105 |
| 2010/0125351 A1 * | 5/2010 | Davydov ........................ | 700/94 |
| 2011/0029666 A1 * | 2/2011 | Lopatecki et al. ............ | 709/224 |
| 2011/0060998 A1 * | 3/2011 | Schwartz et al. ............. | 715/738 |
| 2011/0107369 A1 * | 5/2011 | O'Brien et al. ................ | 725/38 |

OTHER PUBLICATIONS

Gill et. al, "YouTube Traffic Characterization: A View From the Edge," 2007, ACM, pp. 15-28.*
"YouTube—Inspired Bicycles—Danny MacAskill Apr. 2009," Nov. 14, 2009, youtube.com, pp. 1-2.*
"YouTube—Sports," Oct. 25, 2009, youtube.com, pp. 1-2.*

* cited by examiner

*Primary Examiner* — Kieu Vu
*Assistant Examiner* — Asteway T Gattew
(74) *Attorney, Agent, or Firm* — Fenwick & West LLP

(57) ABSTRACT

Methods and systems that identify classic videos. A classic video is a video that consistently receives high viewership over a long period of time. A video hosting server identifies a number of views that a video received for each day during a measurement period. For each day, the video hosting server determines whether the day is a high view day based on the number of views for the day. The video hosting server identifies the video as a classic video responsive to the video having a number of high view days that are above a threshold number of days.

19 Claims, 4 Drawing Sheets

FIG. 3

IDENTIFYING CLASSIC VIDEOS

TECHNICAL FIELD

Embodiments of the present invention generally relate to identifying videos. In particular, the present invention is directed toward identifying videos that have achieved a high-level of viewership over time.

BACKGROUND

Video hosting websites allow users to upload videos for others to view. Generally, a video hosting website functions as an online community of users who post and view videos on the website thereby producing thousands of videos that are posted on the website daily. Some videos may receive very few views whereas other videos may receive hundreds of thousands of views from users across the Internet. Many of those videos that have received a high number of views have become a part of popular culture and have had a major impact on the media, entertainment, and online video industry.

Some video hosting websites direct users to popular videos that have been well received in the community, as measured by a high aggregate number of views. These videos are typically representative of newer videos, music videos and videos that were popular for a short period of time (i.e., viral videos).

SUMMARY

The described embodiments of the present invention provide methods and systems that identify classic videos. In one embodiment, classic videos are representative of the culture of the online community of users that view videos on a video hosting website. Classic videos consistently receive high viewership over long periods of time, in contrast to typical viral videos, which may initially receive high viewership over only a short period of time before interest in the viral videos wanes.

In one embodiment, a video hosting server analyzes a given video to determine whether it is a classic video. The video hosting server determines the number of views the video received for each day that the video was hosted by the server. The video hosting server identifies the number of days on which views received for the video accounted for greater than a threshold amount of all views received across all videos on the video hosting server that day. Responsive to a threshold percentage of the days on which the video is hosted by the server being high view days, the video hosting server identifies the video as a classic video.

The features and advantages described in this summary and the following detailed description are not all inclusive. Many additional features and advantages will be apparent to one of ordinary skill in the art in view of the drawings, specification and claims hereof.

BRIEF DESCRIPTION OF THE DRAWINGS

FIG. 3 illustrates a user interface in which to view classic videos, according to one embodiment.

The figures depict an embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
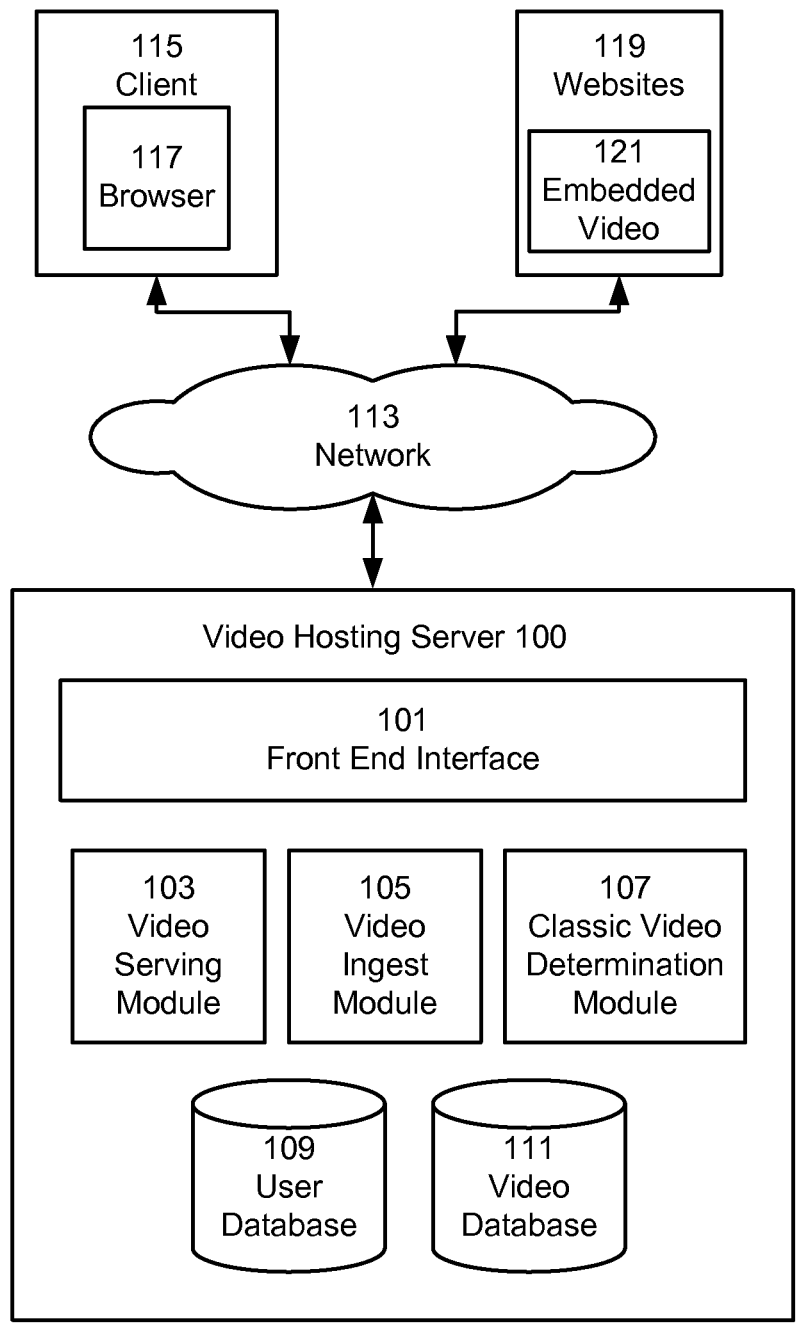
FIG. 1 illustrates a system architecture of a video hosting system according to one embodiment.

Referring now to FIG. 1, there is shown a system architecture of a video hosting server 100 in accordance with one embodiment of the present invention. In one embodiment, the video hosting server 100 allows users to upload videos to the video hosting server 100 for others to view. Accordingly, the video hosting server 100 provides the hosted videos to users for their viewing pleasure. In one embodiment, the video hosting server 100 determines which of the hosted videos are classic videos and provides the classic videos to users as will be described in further detail below.

As shown in FIG. 1, the video hosting server 100 comprises a video serving module 103, a video ingest module 105, a classic video determination (CVD) module 107, a user database 109, and a video database 111 according to one embodiment. Many conventional features, such as firewalls, load balancers, application servers, failover servers, site management tools and so forth are not shown so as not to obscure the features of the system. A suitable website hosted by the video hosting server 100 is the YOUTUBE™ website. Of course, other video hosting sites are known, and can be adapted to operate according to the teachings disclosed herein. It will be understood that the term "website" as used herein represents any computer system adapted to serve content using any networking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

In one embodiment, the video hosting server 100 is implemented as server program executing on server-class computer comprising a CPU, memory, network interface, peripheral interfaces, and other well known components. The computers themselves preferably run an open-source operating system such as LINUX, have generally high performance CPUs, 1G or more of memory, and 100G or more of disk storage. Of course, other types of computers can be used, and it is expected that as more powerful computers are developed in the future, they can be configured in accordance with the teachings here. The functionality implemented by any of the elements can be provided by computer program products that are stored in non-transitory computer-readable storage mediums such as RAM, hard disk, or optical/magnetic media.

As shown in FIG. 1, a client 115 executes a browser 117 to view digital content items (e.g., videos) and may connect to the front end interface 101 via a network 113. In one embodiment, the network 113 is the Internet. However, network 113 can also be any network, including but not limited to any combination of a LAN, a MAN, a WAN, a mobile, wired or wireless network, a private network, or a virtual private network. While only a single client 115 and browser 117 are shown in FIG. 1, in general very large numbers (e.g., millions) of clients are supported and can be in communication with the video hosting server 100 at any time. The client 115 can be implemented on any one of a variety of different computing devices. Examples of client devices 115 are personal computers, digital assistants, personal digital assistants, cellular phones, mobile phones, smart phones, or laptop computers. As will be obvious to one of ordinary skill in the art, the present invention is not limited to the devices listed above.

The browser 117 can include any application that allows users of clients 115 to access web pages on the World Wide Web. Suitable applications include, but are not limited to GOOGLE CHROME, MICROSOFT INTERNET EXPLORER, NETSCAPE NAVIGATOR, MOZILLA FIREFOX, APPLE SAFARI or any application adapted to allow access to web pages on the World Wide Web. The browser 117 can also include a video player (e.g., Flash™ from Adobe Systems, Inc.), or any other media player adapted to play one or more videos hosted on the video hosting server 100. Alternatively, videos can be accessed by a standalone program separate from the browser 117, such as APPLE QUICKTIME or MICROSOFT MEDIA PLAYER. The browser 117 allows the user to access videos from the video hosting server 100 via a user interface provided by the front end interface 101. The user may locate the videos by browsing a catalog of videos, conducting keyword searches, reviewing play lists provided by other users or from the system administrator (e.g., collections of videos forming channels), or by reviewing videos associated with particular user groups (e.g., communities). The browser 117 also allows a user to access a video indirectly, for example, via an embedded video 121 that is accessed via an embedded hyperlink in a third party website 119 or through an embedded hyperlink in an email message.

In one embodiment, users may upload digital content items to the video hosting server 100 through the front end interface 101. The uploaded digital content items can include, for example, video, audio or a combination of video and audio. Alternatively, a digital content item may be a still image, such as a JPEG or GIF file a text file, or an audio file. For purposes of convenience and the description of one embodiment, the uploaded digital content items will be referred to herein as a "video," "video files," or "video items," regardless of the type of digital content uploaded, and no limitation on the type of digital content items should be inferred from this terminology. Thus, the operations described herein for determining classic videos may be equally applied to any type of digital content, not only videos; other suitable types of digital content items include audio files (e.g. music, podcasts, audio books, and the like), documents, websites, images, multimedia presentations, and so forth.

To upload videos to the video hosting server 100, a user's client 115 connects to the front end interface 101 via the network 113. The uploaded videos are processed by a video ingest module 105, which processes the videos for storage in the video database 111. This processing can include video format conversion (transcoding), compression, metadata tagging, as well as other data processing. The video ingest module 105 processes the videos in order to standardize content for playback to users of clients 115. In particular, transcoding the videos from one format to another enables the video hosting server 100 to receive uploaded videos of various formats and to provide a standardized output format to users. An uploaded video file is associated with the user that uploaded the video and the user's account record is updated in the user database 109 as needed.

The video database 111 is used to store the ingested videos. The video database 111 stores video content and associated metadata provided by their respective users. Each uploaded video is assigned a video (id) when it is processed by the video ingest module 105. The video files have metadata associated with each file such as a video ID, artist, video title, label, genre, time length, a classic video designation (i.e., identifier) and optionally geo-restrictions that can be used for data collection or content blocking on a geographic basis.

The user database 109 stores a record of all registered users of the video hosting server 100. Registered users include users who provide videos to the video hosting server 100 as well as users who simply view videos on the video hosting server 100. Each content user registers account information including login name, electronic mail (e-mail) address and password with the video hosting server 100. This account information is stored in the user database 109.

As noted, users of clients 115 execute a browser 117 and connect to the front end interface 101 to view videos that have been uploaded to the video hosting server 100. Users of clients 115 can search for videos based on keywords, tags or other metadata. These requests are received as queries by the front end interface 140 and provided to the video serving module 103 that searches the video database 111 for videos that satisfy the user queries. In one embodiment, the video serving module 103 provides the videos retrieved from the video database 111 to the users requesting the videos. The video serving module 103 supports searching on any fielded data for a video, including its title, description, tags, author, category and so forth. Alternatively, users can browse a list of videos based on categories such as classic videos, most viewed videos, top rated videos or content specific categories such as sports, animals, or automobiles.

In one embodiment, the CVD module 107 determines which videos stored in the video database 111 are classic videos. The CVD module 107 may identify whether a set of the videos stored in the video database 111 are classic videos or may identify whether all videos stored in the video database 111 are classic videos. In one embodiment, a classic video is a video that receives a high number of views per day (i.e., a high view day) for a long period of time compared to a typical video stored in the video database 111. Classic videos are iconic videos and represent the culture of the community (i.e., the registered users) of the video hosting server 100 according to one embodiment. Classic videos consistently receive high viewership over long periods of time.

In one embodiment, the CVD module 107 determines whether each day in which the video is hosted by the video hosting server 100 is a high view day. According to one embodiment, a high view day for a given video is a day "d" on which the views received for the video represent (accounts for) at least a threshold percentage (e.g., 0.001%) of all views received for all videos on the video hosting server 100 for that day. That is, if the views that a video received on day "d" are at least p % of all views on the video hosting server 100, day "d" is a high view day for the video. For example, consider a day where the video hosting server 100 received a total of two million views on that day. For a given video, the video had a high view day if it received at least 2,000 views on that day assuming that the threshold percentage is set at 0.001% of all views.

To determine whether a video is a classic video, the CVD module 107 determines for each video whether at least a threshold percentage (e.g., 70%) of the days since the video was uploaded to the video hosting server 100 were high view days. That is, the CVD module 107 determines if at least q % of the days that the video has been hosted by the video hosting server 100 (i.e., a measurement period) were high view days. In other words, the CVD module 107 calculates a ratio of the high view days relative to the number of days since the beginning of the measurement period. Note that the measurement period may comprise a subset of the days in which the video has been hosted by the video hosting server 100 and/or the period may comprise non-contiguous days. Responsive to the ratio being above a threshold percentage, the CVD module 107 identifies the video as a classic video. Responsive to the video having the threshold percentage of high view days, the CVD module 107 identifies the video as a classic video and stores a classic video designation (e.g., an identifier) for the video in the video database 111 indicating that the video is a classic video.

In one embodiment, to determine classic videos, at predefined intervals the CVD module 107 determines videos from the video database 111 that are at least "k" days old (e.g., 100 days) in terms of days since the videos were uploaded to the video hosting server 100. For each video that is at least "k" days old, the CVD module 107 determines whether at least q % of the days that the video has been hosted by the video hosting server 100 were high view days. Videos with at least q % of high view days are designated as classic videos by the CVD module 107. In one embodiment, the CVD module 107 may determine videos that are "k" days old on a daily basis, weekly basis, monthly basis, yearly basis or at any other time interval determined by a system administrator of the video hosting server 100.

In one embodiment, once a video meets the criteria described above to be considered a classic video, the video is always considered a classic video regardless of whether in the future the video no longer fulfills the criteria of a classic video. For example, a given video is hosted by the video hosting server 100 for 1,000 days (i.e., the video is 1,000 days old). During the first 70 days of the video being hosted by the video hosting server 100, each of the first 70 days were high view days. Thus, after 100 days from the hosting date of the video, the CVD module 107 determines that the video is a classic video. During the remaining 930 days of the video being hosted within the 1,000 day period, even if the video did not receive any views at all and thus does not fulfill the criteria for a classic video, the video is still considered a classic video. As mentioned previously, once a video is a classic video, it remains a classic video. In alternate embodiments, classic videos may be demoted responsive to the criteria for a classic video not being met.

Figure 2:
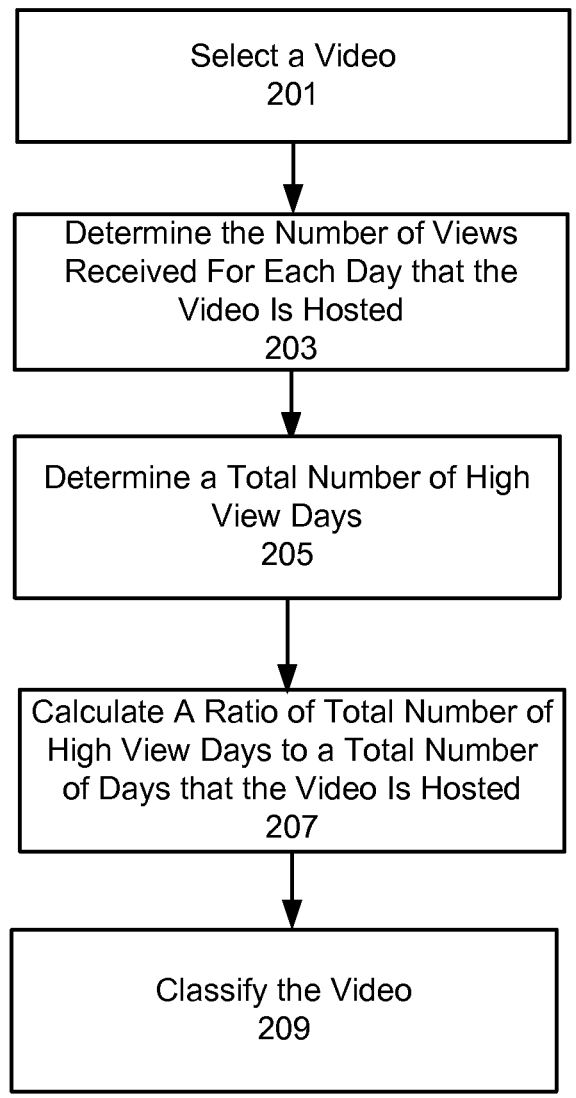
FIG. 2 illustrates a method for determining classic videos, according to one embodiment.

Referring now to FIG. 2, there is shown one embodiment of a method to determine classic videos. Not that in other embodiments, other steps may be performed than those illustrated in FIG. 2.

In one embodiment, the CVD module 107 selects 201 a video from the video database 111. The CVD module 107 may select a video that is hosted for k days on the video hosting server 100. For example, the CVD module 107 retrieves a video that is at least 100 days old. The CVD module 107 determines 203 for each day that the video is hosted on the video hosting server 100 (i.e., a measurement period), the number of views that the video received for the day. For example, if the video is 200 days old, the CVD module 107 determines the number of views that the video received for each of the 200 days in the measurement period. Note that the measurement period may comprise a subset of the days in which the video is hosted by the video hosting server 100. Also, the measurement period may not comprise a contiguous number of days. For example, during a week-long measurement period, the period may only comprise the following days: Sunday through Tuesday and Thursday through Saturday.

The CVD module 107 then determines 205 a total number of high view days associated with the video. That is, for each day, the CVD module determines whether the video received a threshold percentage of all views received at the video hosting server 100 for that day. Each day that the video received the threshold percentage of all views is considered a high view day. The CVD module 107 calculates 207 a ratio of the total number of high view days to a total number of days that the video is hosted on the video hosting server 100. The CVD module 107 classifies 209 the video based on the ratio. That is, in response to the ratio being above a threshold, the CVD module 107 stores an identifier with the video indicating that it is a classic video. In other words, if the ratio indicates that q % of the k days are high view days, the video is a classic video.

Figure 3:
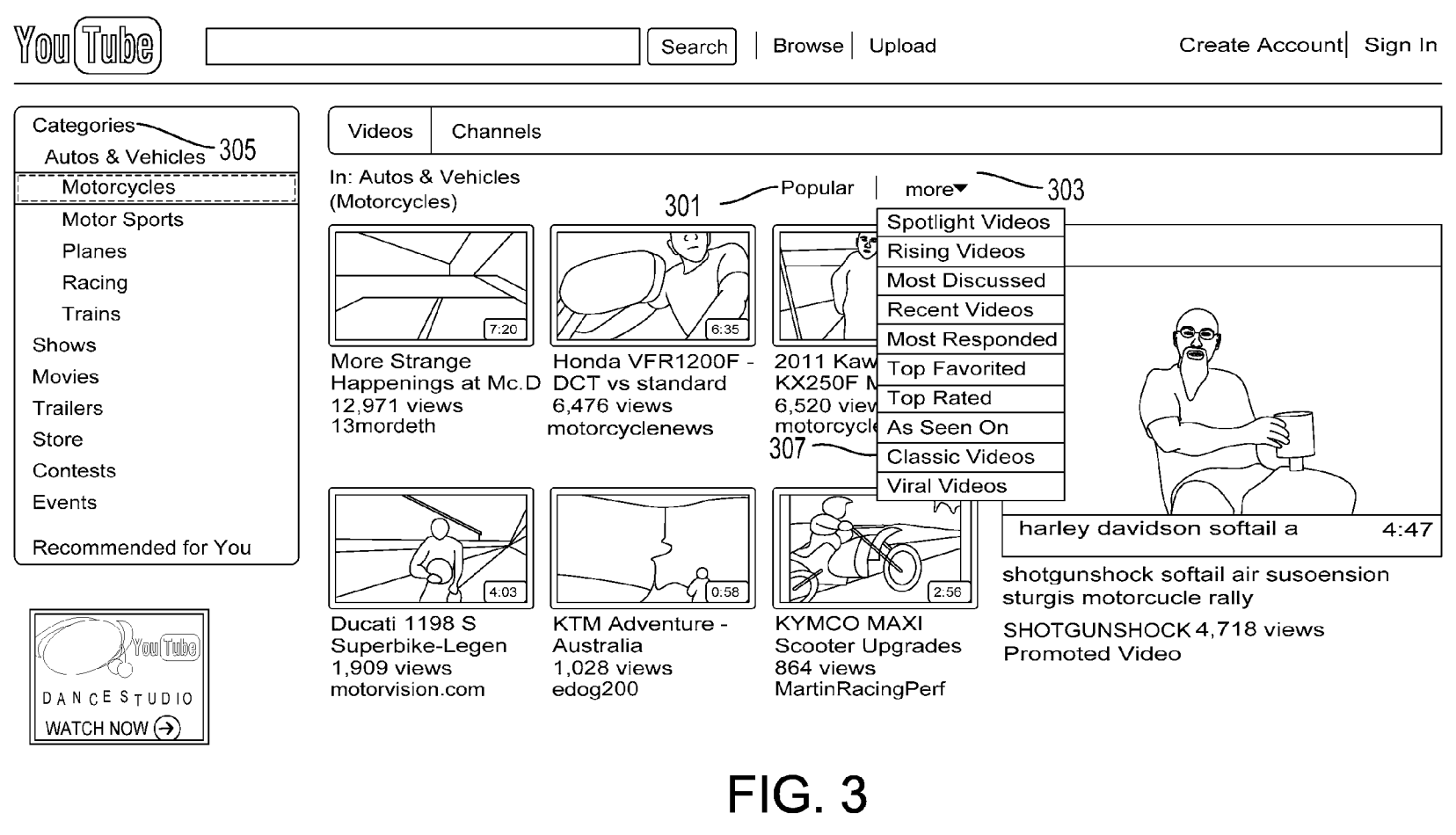

Referring now to FIG. 3, there is shown one embodiment of a user interface to locate classic videos. In one embodiment, a user of client 115 may navigate to the website hosted by the video hosting server 100. The user of client 115 may browse through all the different categories of popular videos 301 hosted by the server 100 as illustrated in FIG. 3. The user may also browse videos in the most viewed videos section (not shown) or view videos by content category 305.

In one embodiment, to view classic videos, the "more" drop down menu 303 is selected causing additional video categories to be shown. Responsive to receiving a selection of the classic videos 307 button, the video hosting server 100 displays to the user thumbnails or other representations of classic videos from which the user may select a classic video to view. In other embodiments, a tag or keyword, such as "classic videos" in a search query of a search engine website or of the video hosting server 100 may be used to limit the videos returned from a search.

Figure 4:
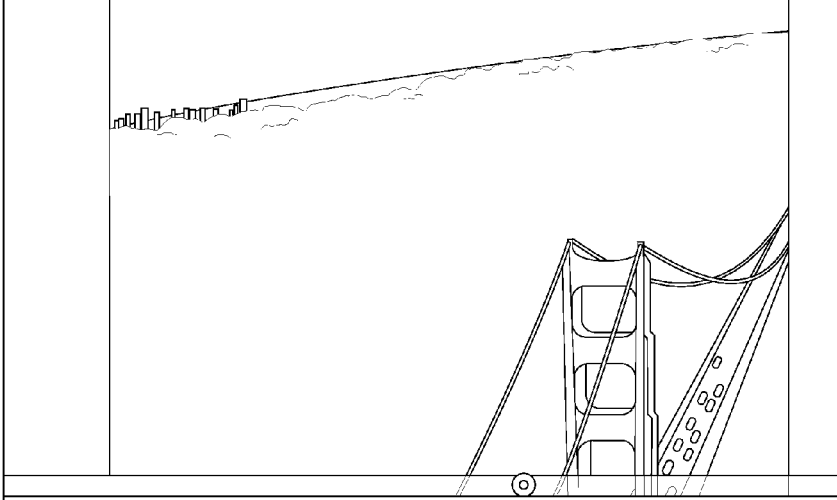
FIG. 4 illustrates a view page of a classic video, according to one embodiment.

Referring now to FIG. 4, there is shown one embodiment of a view page of a classic video. For each classic video, in the highlight section 401, a classic video indication 403 is shown indicating that the video is a classic video.

The features described herein beneficially provide a system and method to determine classic videos of a video hosting website. The classic videos are representative of the culture of the video community of the video hosting server 100.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for collaboratively ranking a set of digital content items through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for identifying classic videos from among a plurality of videos, the method executed by a computer and comprising:
   for each video of a plurality of videos hosted by a video hosting server:
      identifying a number of daily views that the video received during each of a plurality of days during a measurement period from a plurality of users;
      determining, for each of the plurality of days on which the number of daily views that the video received exceeded a threshold number of daily views, that the day was a high view day, the threshold number of daily views representing a percentage of all views received for videos hosted by the video hosting server; and
      responsive to a total number of high view days for the video exceeding a threshold number of days of the measurement period, storing an association with the video indicating that the video is a classic video.

2. The computer-implemented method of claim 1, further comprising selecting the plurality of videos, wherein selecting the plurality of videos comprises:
   for each of the plurality of videos, identifying whether the video has been provided on the video hosting server or a search engine website for at least a threshold number of days.

3. The computer-implemented method of claim 1, wherein responsive to the total number of high view days for the video exceeding the threshold number of days of the measurement period comprises:
   calculating a ratio of the total number of high view days and a number of days during the measurement period;
   comparing the ratio to a threshold percentage; and
   responsive to the ratio being above the threshold percentage, storing the association with the video indicating that the video is a classic video.

4. The computer-implemented method of claim 1, wherein a classic video represents a culture of users that view videos on the video hosting server.

5. The computer-implemented method of claim 1, wherein storing the association with the video comprises:
   updating a status identifier associated with the video, the status identifier indicating that the video is a classic video.

6. The computer-implemented method of claim 1, further comprising:
   displaying an indication on a view page of the video indicating that the video is a classic video.

7. The computer-implemented method of claim 1, further comprising:
   receiving a selection of a classic videos menu user interface element, the selection indicative of a request to view classic videos.

8. The computer-implemented method of claim 7, further comprising:
   responsive to receiving the selection of the classic videos menu user interface element, providing thumbnail representations of classic videos identified from the plurality of videos.

9. A computer program product comprising a non-transitory computer-readable storage medium containing computer program code for controlling a processor to perform a method for identifying classic videos from among a plurality of videos, the method comprising:
   for each video of a plurality of videos hosted by a video hosting server:
      identifying a number of daily views that the video received during each of a plurality of days during a measurement period from a plurality of users;
      determining, for each of the plurality of days on which the number of daily views that the video received exceeded a threshold number of daily views, that the day was a high view day, the threshold number of daily views representing a percentage of all views received for videos hosted by the video hosting server; and
      responsive to a total number of high view days for the video exceeding a threshold number of days of the measurement period, storing an association with the video indicating that the video is a classic video.

10. The computer program product of claim 9, wherein the non-transitory computer-readable storage medium further contains computer program code for selecting the plurality of videos, wherein selecting the plurality of videos comprises:
    for each of the plurality of videos, identifying whether the video has been displayed on a video hosting server for at least a threshold number of days.

11. The computer program product of claim 9, wherein the non-transitory computer-readable storage medium further contains computer program code for:
    calculating a ratio of the total number of high view days and a number of days during the measurement period;
    comparing the ratio to a threshold percentage; and
    responsive to the ratio being above the threshold percentage, storing the association with the video indicating that the video is a classic video.

12. The computer program product of claim 9, wherein a classic video represents a culture of users that view videos on the video hosting server.

13. The computer program product of claim 9, wherein the non-transitory computer-readable storage medium further contains computer program code for:
    updating a status identifier associated with the video, the status identifier indicating that the video is a classic video.

14. The computer program product of claim 9, wherein the non-transitory computer-readable storage medium further contains computer program code for:
    displaying an indication on a view page of the video indicating that the video is a classic video.

15. A system for identifying classic videos from among a plurality of videos, the system comprising:
  at least one server computer comprising a computer processor and a storage database comprising videos, the computer processor configured to execute instructions stored on a computer-readable storage medium, the instructions when executed by the computer processor cause the processor to:
    for each video of a plurality of videos hosted by a video hosting server:
      identify a number of daily views that the video received during each of a plurality of days during a measurement period from a plurality of users;
      determine, for each of the plurality of days on which the number of daily views that the video received exceeded a threshold number of daily views, that the day was a high view day, the threshold number of daily views representing a percentage of all views received for videos hosted by the video hosting server; and
      responsive to a total number of high view days for the video exceeding a threshold number of days of the measurement period, store an association with the video indicating that the video is a classic video.

16. The system of claim 15, wherein the instructions when executed by the computer processor further cause the processor to select the plurality of videos, wherein selecting the plurality of videos comprises:
  for each of the plurality of videos, identifying whether the video has been displayed on a video hosting server for at least a threshold number of days.

17. The system of claim 15, wherein the instructions when executed by the computer processor further cause the processor to:
  calculate a ratio of the total number of high view days and a number of days during the measurement period;
  compare the ratio to a threshold percentage; and
  responsive to the ratio being above the threshold percentage, store the association with the video indicating that the video is a classic video.

18. The system of claim 15, wherein a classic video represents a culture of users that view videos on the video hosting server.

19. The system of claim 15, wherein the instructions when executed by the computer processor further cause the processor to:
  update a status identifier associated with the video, the status identifier indicating that the video is a classic video.

* * * * *